United States Patent [19]

Nishimura et al.

[11] 4,259,668
[45] Mar. 31, 1981

[54] TELEVISION SET/CALCULATOR INTERFACE INCLUDING EXCHANGEABLE KEYBOARD PANEL AND PROGRAM MEMORY CARTRIDGE

[75] Inventors: Kosuke Nishimura, Yamatokoriyama; Hirohide Nakagawa, Sakurai; Isamu Haneda, Yamatokoriyama, all of Japan

[73] Assignee: Sharp Kabushiki Kaisha, Osaka, Japan

[21] Appl. No.: 38,546

[22] Filed: May 14, 1979

[30] Foreign Application Priority Data

May 15, 1978 [JP] Japan ................................ 53-57830
May 15, 1978 [JP] Japan ................................ 53-57831

[51] Int. Cl.³ ............................................ G06F 3/153
[52] U.S. Cl. .................................. 340/711; 273/85 G;
340/799; 340/723; 364/706
[58] Field of Search ....................... 340/706, 711, 799;
364/706; 273/85 G, DIG. 28; 35/9 B

[56] References Cited

U.S. PATENT DOCUMENTS

| | | | |
|---|---|---|---|
| 3,911,424 | 10/1975 | Giannuzzi et al. | 340/799 X |
| 4,026,555 | 5/1977 | Kirschner et al. | 340/711 X |
| 4,037,092 | 7/1977 | Osborne et al. | 364/706 |
| 4,063,221 | 12/1977 | Watson et al. | 364/706 X |
| 4,095,791 | 6/1978 | Smith et al. | 273/85 G |
| 4,117,469 | 9/1978 | Levine | 340/711 X |
| 4,143,360 | 3/1979 | Bernhart et al. | 340/799 X |

*Primary Examiner*—David L. Trafton
*Attorney, Agent, or Firm*—Birch, Stewart, Kolasch & Birch

[57] ABSTRACT

A combined home-use-television set/calculator electronic system comprising a control unit for conducting arithmetic calculations and for displaying calculation results on an image screen of the home-use-television set. A keyboard unit is exchangeably connected to the control unit for increasing operation abilities of the combined home-use-television set/calculator electronic system. A read only memory cartridge is exchangeably secured to the control unit. A read only memory corresponding to a selected keyboard unit is secured to the control unit for developing operation instruction signals which are required for performing the arithmetic calculations associated with the selected keyboard unit.

9 Claims, 18 Drawing Figures

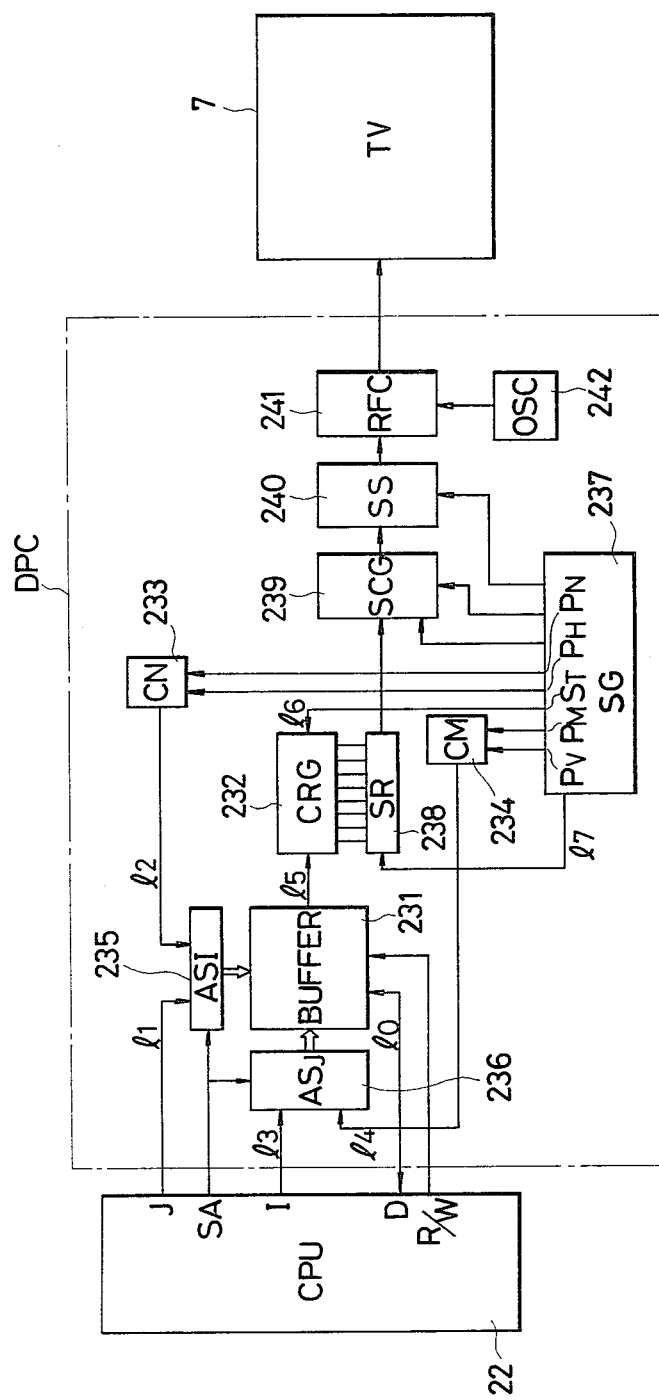
FIG. 3 (DISPLAY CONTROL -23-)

FIG. 4 (BUFFER MEMORY -231-)

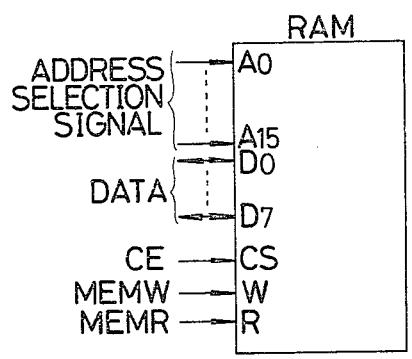
FIG. 12
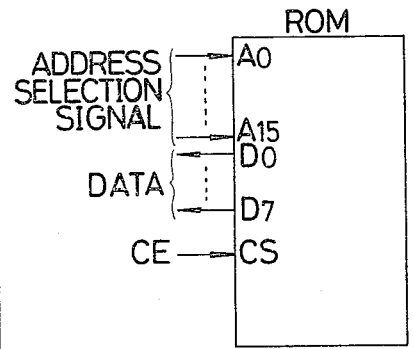
FIG. 13
FIG. 14
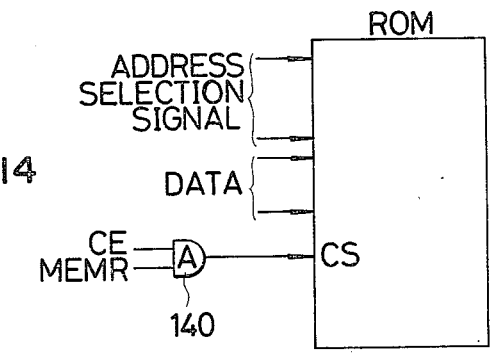
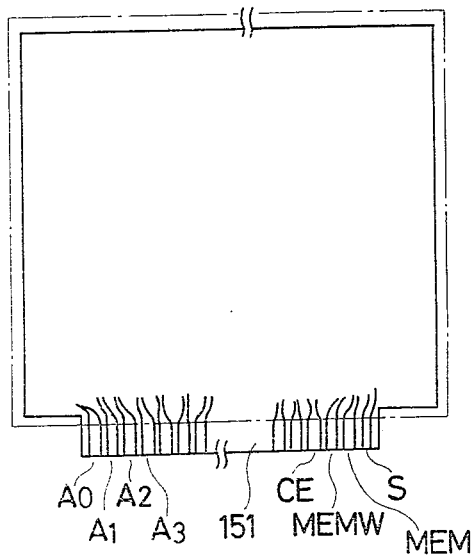
FIG. 15

TELEVISION SET/CALCULATOR INTERFACE INCLUDING EXCHANGEABLE KEYBOARD PANEL AND PROGRAM MEMORY CARTRIDGE

BACKGROUND AND SUMMARY OF THE INVENTION

The present invention relates to an electronic apparatus including an input unit such as a keyboard panel for introducing desired information, and a display drive system for displaying desired information such as an operation result on a television image screen of a home use television set.

Recently, there have been developed various electronic apparatuses including a digitalized control system. These electronic apparatuses perform various functions when input information and memorized programs are changed.

Meanwhile, an electronic system including a home use television set as an information display has been developed. An example is described in copending application, Readout Means of a Calculator Operatively Associated with a Home Use TV Image Screen, Ser. No. 959,603, filed Nov. 9, 1978 by Sigeaki Masuzawa and Isamu Haneda and assigned to the same assignee as the present application.

Accordingly, an object of the present invention is to provide an electronic system including a home use television set as an information display unit.

Another object of the present invention is to provide an electronic apparatus including a keyboard panel for introducing desired information, a calculation circuit, and a display drive system for displaying a calculation result on a television image screen of a home use television set.

Still another object of the present invention is to provide an electronic system including a home use television set as an information display unit, wherein an input unit for introducing desired information into the electronic system is removably secured to the system for facilitating the exchange to achieve various operations.

Yet another object of the present invention is to provide an electronic apparatus which can perform various functions when input means and program memory means are exchanged.

A further object of the present invention is to provide an electronic apparatus which includes a read only memory cartridge exchangeably secured to the electronic apparatus.

A still further object of the present invention is to provide an electronic apparatus which includes an exchangeable read only memory cartridge for storing information related to a fixed program, and an exchangeable random access memory cartridge for storing information related to an option program written by an operator.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a keyboard panel is constructed so as to be exchangeably connected to a control unit which includes a central processor unit responding to input information derived from the keyboard panel, and a display control system for displaying an operation result stored in the central processor unit on a television image screen of a home use television set. A memory cartridge is exchangeably secured to the control unit. The memory cartridge stores program information for conducting a desired operation by the control unit.

When the operator desires to perform a specific operation, a selected keyboard panel and a corresponding memory cartridge are associated with the control unit.

In a preferred form, a program memory is incorporated in the keyboard panel. The thus combined keyboard/program memory unit is exchangeably connected to the control unit for performing various operations. A printer unit is connected to the control unit for printing out the operation result stored in the control unit.

In another preferred form, two types of memory cartridges are provided. One is a read only memory cartridge for storing information related to a fixed program. The other is a random access memory cartridge into which a desired program sequence is written at an operator's choice. The control unit is constructed to accommodate both the read only memory cartridge and the random access memory cartridge. A detection means is provided to preclude the write-in operation when the read only memory cartridge is secured to the control unit.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 3 is a block diagram of a display control circuit included in a control unit shown in FIGS. 1 and 2;

FIG. 4 is a schematic chart of a buffer memory included in the display control circuit of FIG. 3;

FIG. 7 is a plan view of an embodiment of a keyboard unit included in the combined TV/calculator system of FIGS. 1 and 2;

FIGS. 8 through 11 are charts for explaining operation modes of the combined TV/calculator system employing the keyboard unit of FIG. 7;

FIG. 12 is a schematic plan view showing terminals included in a random access memory;

FIG. 13 is a schematic plan view showing terminals included in a read only memory;

FIG. 14 is a schematic circuit diagram for ensuring an accurate operation when an ROM cartridge is employed;

FIG. 15 is a plan view of a terminal unit included in an embodiment of a memory cartridge of the present invention;

DESCRIPTION OF THE PREFERRED EMBODIMENTS

Figure 1:
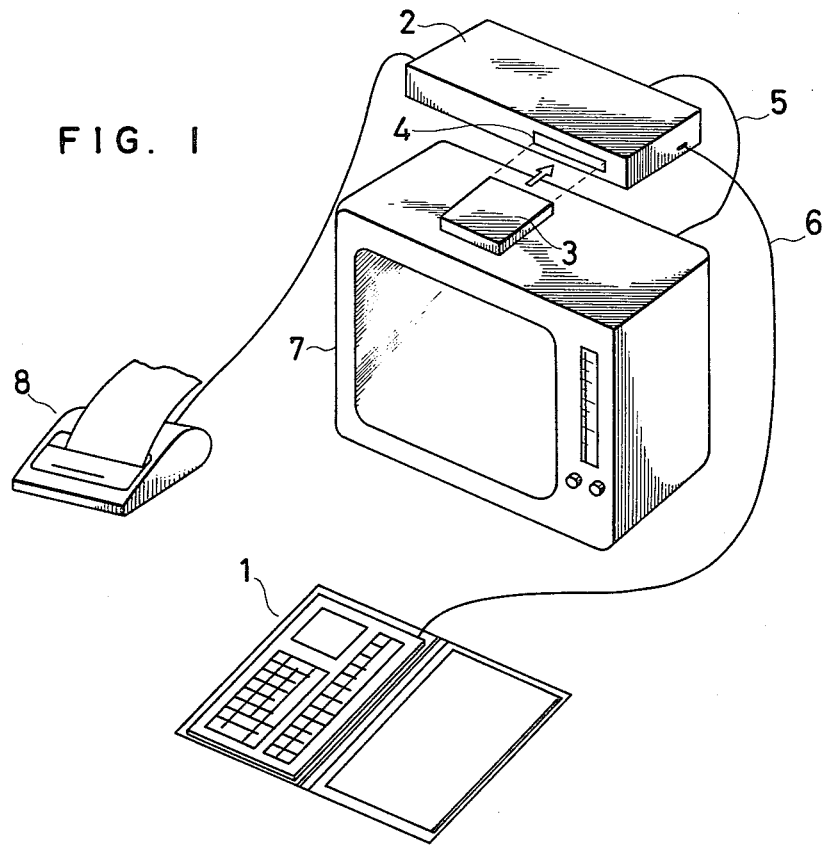
FIG. 1 is a perspective view of an embodiment of a combined TV/calculator system of the present invention.

FIG. 1 shows an embodiment of a combined TV/calculator system of the present invention.

The combined TV/calculator system of the present invention mainly comprises a keyboard unit 1, a control unit 2, and a home use television set 7. The keyboard unit 1 is exchangeably connected to the control unit 2 through a wire 6. The control unit 2 is provided with an opening 4 into which a memory cartridge 3 is exchangeably, removably secured. The memory cartridge 3 stores information related to a program sequence for conducting a desired operation by the control unit 2. The control unit 2 is connected to an antenna terminal of the home use television set 7 through a wire 5 in order to display desired information on the image screen of the home use television set 7. A printer 8 is connected to the control unit 2 to print out the information displayed on the image screen of the home use television set 7.

Fundamental constructions and operation modes of the combined TV/calculator system are described in copending application, Readout Means of a Calculator Operatively Associated with a Home Use TV Image Screen, Ser. No. 959,603, filed Nov. 9, 1978 by Sigeaki Masuzawa an Isamu Haneda and assigned to the same assignee as the present application.

The memory cartridge 3 must be correlated with the keyboard unit 1. That is, when the keyboard unit 1 is exchanged to perform other operations, the memory cartridge 3 is also changed to the one corresponding to the newly selected keyboard unit 1. More specifically, when the operator desires to use the combined TV/calculator system as an electronic learning aid, the keyboard unit 1 suited for the electronic learning aid operation and the memory cartridge 3 storing the program sequence for performing the electronic learning aid operation are selected and connected to the control unit 2.

To facilitate the handling, a memory unit storing the program sequence can be incorporated into the keyboard unit 1. A plurality of the thus combined keyboard/program memory units can be stacked and bound together like a book.

Figure 2:
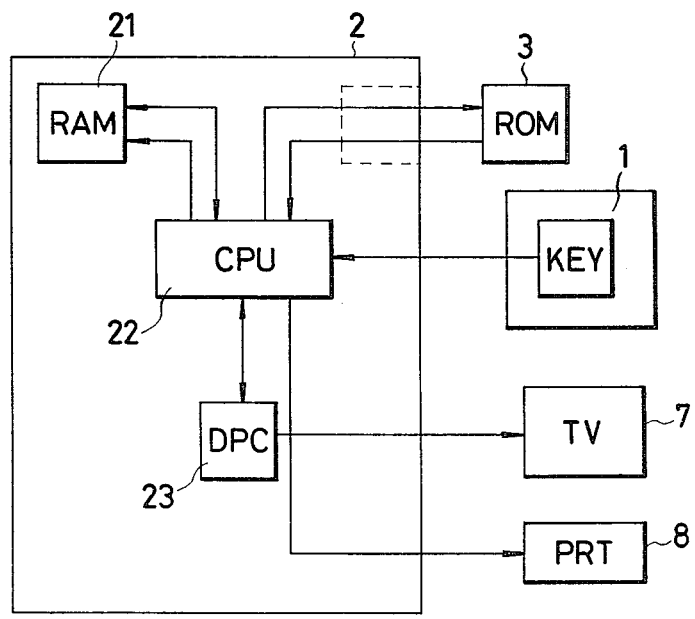
FIG. 2 is a schematic block diagram of the combined TV/calculator system of FIG. 1.

FIG. 2 is a schematic block diagram of the combined TV/calculator system of FIG. 1.

The control unit 2 mainly comprises a random access memory 21, a central processor unit 22, and a display control circuit 23 for displaying desired information on the image screen of the home use television set 7. The central processor unit 22 is responsive to output signals derived from the keyboard unit 1, the memory cartridge 3 and the random access memory 21 for performing desired operations. The operation result is applied to the display control circuit 23, and also to the printer 8.

FIG. 3 shows the display control circuit 23 included in the control unit 2.

The display control circuit 23 mainly comprises a buffer memory 231 and a character generator 232. Address selection circuits 235 and 236 are connected to the buffer memory 231 for addressing the memory sections aligned in the buffer memory 231 in a matrix fashion. When a write signal is derived from a terminal R/W of the central processor unit 22, desired information is written into a desired memory section of the buffer memory 231. The information to be written is derived from a data terminal D of the central processor unit 22 and applied through a signal line $l_0$. When a readout signal is developed from the terminal R/W of the central processor unit 22, the information stored in the selected memory section of the buffer memory 231 is transferred to the central processor unit 22 through the signal transmission line $l_0$.

Column selection signal transmission lines $l_1$ and $l_2$ are connected to the address selection circuit 235. Row selection signal transmission lines $l_3$ and $l_4$ are connected to the address selection circuit 236. A priority determination signal is applied from a selection signal terminal SA of the central processor unit 22 to the address selection circuit 235 and 236 in order to determine whether the address selection circuit 235 should follow the signal applied through the line $l_1$ or $l_2$, and the address selection circuit 236 should follow the signal applied through the line $l_3$ or $l_4$.

Figure 5:
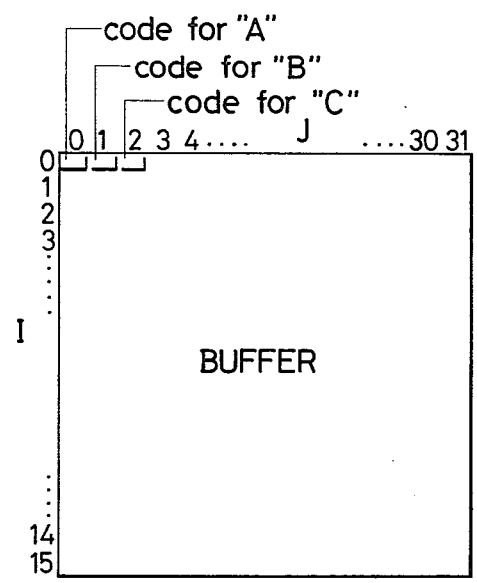
FIG. 5 is a schematic chart showing a display condition on an image screen of a home use television set included in the combined TV/calculator system of FIG. 1.

The buffer memory 231 stores data related to characters to be displayed in an eight-bit coded signal. More specifically, the buffer memory 231 comprises 32×16 memory sections as shown in FIG. 4, each section comprising eight-bit positions. The data stored in a specific memory section of the buffer memory 231 is displayed on the image screen of the home use television set 7 in an 8×8 dot matrix fashion as shown in FIG. 5. That is, the central processor unit 22 controls to write-in desired information to be displayed into a desired memory section of the buffer memory 231 corresponding to the display position on the image screen of the home use television set 7.

The information stored in the buffer memory 231 is transferred to the character generator 232 via a line $l_5$ in synchronization with the scanning operation of the home use television set 7. A column counter 233 and a row counter 234 are provided for progressively advancing the selection of the memory sections of the buffer memory 231. The column counter 233 is a counter of radix "32", which is responsive to a horizontal synchronizing pulse train signal and a horizontal division pulse train signal derived from a signal generator 237. The row counter 234 is a counter of radix "16", which is responsive to a vertical synchronizing pulse train signal and a vertical division pulse train signal derived from the signal generator 237.

More specifically, the column counter 233 counts up in response to the horizontal division pulse train signal derived from a terminal $P_N$ of the signal generator 237, and the column counter 233 is cleared to zero upon generation of the horizontal synchronizing pulse train signal from a terminal $P_H$ of the signal generator 237. The row counter 234 counts up in response to the vertical division pulse train signal applied from a terminal $P_M$ of the signal generator 237, and is reset to zero upon generation of the vertical synchronizing pulse train signal from a terminal $P_V$ of the signal generator 237.

The image screen of the home use television set 7 is divided into a plurality of picture point elements. That is, the image screen is considered as a matrix of (2M+1)×(2N+1), where M and N are integer numbers. The character generator 232 functions to decode the information data stored in the buffer memory 231 in response to a timing signal applied from a terminal $S_T$ of the signal generator 237 through a signal line $l_6$. The thus decoded signal is applied to a shift register 238, which functions to parallel-to-serial convert the character signal.

Figure 6:
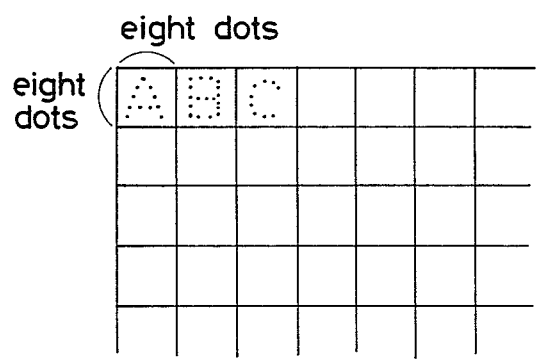
FIG. 6 is a schematic chart showing contents stored in a character generator included in the display control circuit of FIG. 3.

The display control operation is as follows:

The column and row counters 233 and 234 are first reset to zero and select the address I, J=0, 0 of the buffer memory 231. Now assume that the memory section of the address (0, 0) of the buffer memory 231 stores the code signal related to a character "A". The code signal of the character "A" is applied to the character generator 232. The character generator 232 also receives a timing signal representing a first row of one character through the line $l_6$. The character generator 232 develops a signal "00111000" corresponding to the first row of the character "A" (see FIG. 6) to the shift register 238. Thereafter, the signal generator 237 develops a shift signal, which is applied to the shift register 238 through a line $l_7$. Therefore, the shift register 238 serially develops the data signal to a bright/color signal generator 239.

Upon completion of development of the signal "00111000", the column and row counters 233 and 234 select the address, I, J=0, 1 of the buffer memory 231 (see FIG. 4). The buffer memory 231 stores the code signal related to a character "B" at the memory section (0,1). Therefore, a signal corresponding to the first row of the character "B" is developed from the character generator 232 toward the shift register 238. These operations are repeated to the address (o, 31) of the buffer memory 231 to complete the first line scanning of the image screen.

Then, the column and row counters 233 and 234 again select the address (o, 0) of the buffer memory 231 (see FIG. 4). At this moment, a timing signal representing a second row of one character is applied from the signal generator 237 to the character generator 232 through the line $l_6$. Therefore, the character generator 232 develops a signal "01000100" (see FIG. 6) to the shift register 238. These operations are repeated to the 128th dot position (8×16) to complete one field scanning. Thereafter, the column and row counters 233 and 234 again select the address I, J=0, 0.

The bright/color signal generator 239 receives the data signal from the shift register 238, and responds to a color carrier signal and a blanking pulse derived from the signal generator 237. An output signal of the bright/color signal generator 239 is applied to a signal composer 240, which also receives the horizontal synchronizing signal, the vertical synchronizing signal, an equalizing pulse and a bust signal to provide a video signal. The video signal derived from the signal composer 240 is applied to a high-frequency modulator 241, which responds to a signal derived from a high-frequency oscillator 242 in order to convert the video signal to the TV frequency. The thus obtained signal is applied to the antenna terminal of the home use television set 7 from the high-frequency modulator 241.

Figures 7, 8:
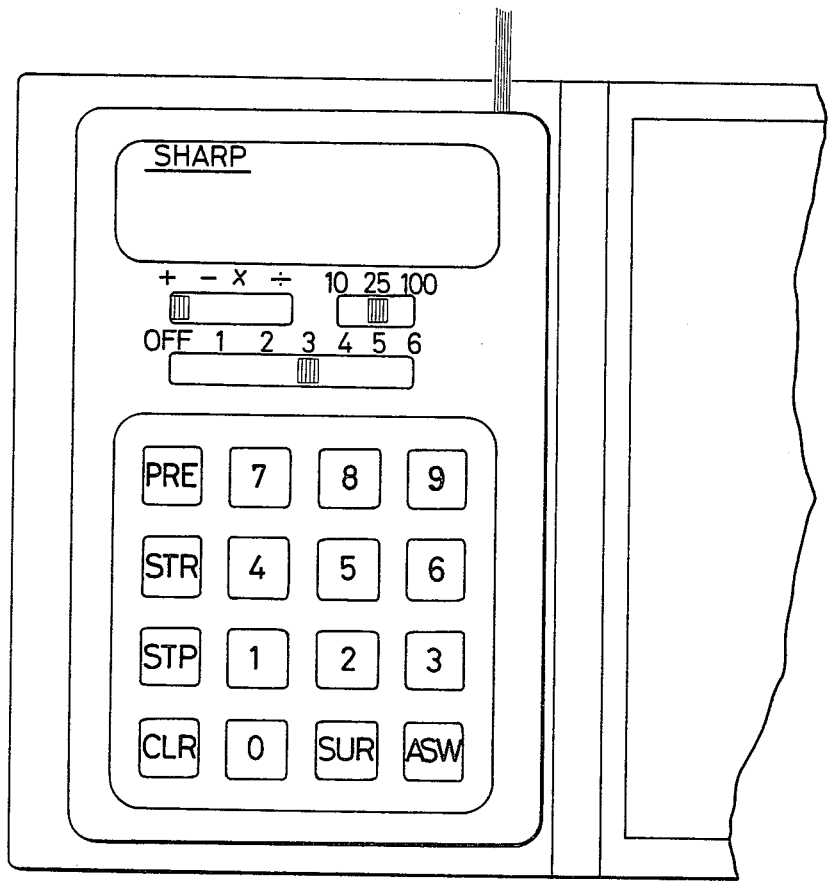

FIG. 7 shows an example of the keyboard unit, wherein the present combined TV/calculator system functions as an electronic learning aid.

Fundamental constructions and operation modes of the electronic learning aid are described in copending application, Electronic Learning Aid, Ser. No. 952,203, filed Oct. 17, 1978 by Takashi Sakaue, Koichi Hatta, Megumi Fukusaki and Yoshiro Kataoka and assigned to the same assignee as the present application.

In brief, the electronic learning aid automatically provides and displays problems of mathematics. Students introduce their answer through the keyboard unit shown in FIG. 7 after calculation with figures. Then, the electronic learning aid functions to compare the introduced answer with a correct answer stored therein. Thereafter, the score is displayed. In the present combined TV/calculator system, the home use television set 7 functions as the display panel for the electronic learning aid.

Figure 9:
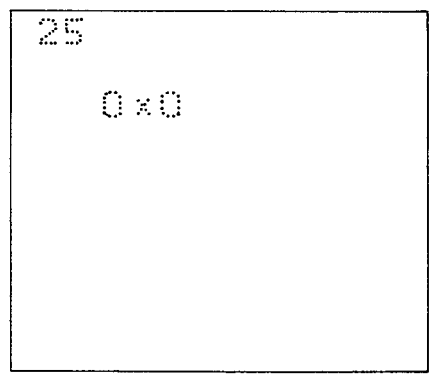

When, for example, the operator selects the multiplication problems, the third class difficulty and the 25 problems through the keyboard unit shown in FIG. 7, and then a preparation key PRE is actuated, this data is stored in the random access memory 21 (see FIG. 2). The buffer memory 231 (see FIG. 3) stores code signals as shown in FIG. 8 to display the preparation condition on the image screen of the home use television set 7 as shown in FIG. 9.

More specifically, the memory section (0, 1) of the buffer memory 231 stores a code signal "00110010" of the numeral "2", and the memory section (0, 2) of the buffer memory 231 stores a code signal "00110101" of the numeral "5". The memory sections (3, 4) and (3, 6) store a code signal "00110000" for displaying the numeral "0", and the memory section (3, 5) stores a code signal "01001100" for displaying the symbol "X".

Thereafter, when a start key STR (see FIG. 7) is actuated, the multiplication problems are automatically developed in accordance with information stored in the random access memory 21 (see FIG. 2). FIG. 10 shows contents stored in the buffer memory 231 when the first problem is developed from the central processor unit 22 (see FIG. 2).

Figure 11:
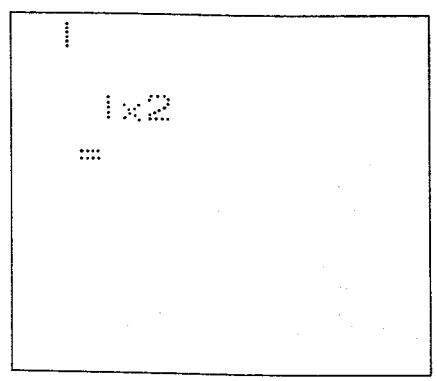

More specifically, the memory sections (0, 2) and (3, 4) store a code signal "00110001" of the numeral "1", the memory section (3, 6) stores a code signal "00110010" of the numeral "2", the memory section (3, 5) stores a code signal "01001100" of the symbol "X", and the memory section (5, 3) stores a code signal "01001111" of the symbol "=". FIG. 11 shows a display condition when the first problem is developed. Remaining memory sections store the blanking code, for example, "11111111". This is controlled by the program stored in the memory cartridge 3 (read only memory). Of course, the memory cartridge 3 is selected to the one which contains programs related to the electronic learning aid.

Of course, the memory cartridge 3 is selected to the one which contains programs related to the electronic learning aid.

In the foregoing embodiments, the memory cartridge 3 comprises a read only memory. The read only memory memorizes a fixed program sequence. When the operator desires to program a novel sequence on his choice, the memory cartridge 3 must be capable of writing desired information therein. In this case, a random access memory can be used as the memory cartridge 3. To perform accurate operation, the control unit 2 must detect whether the ROM cartridge or the RAM cartridge is inserted in the opening 4.

FIG. 12 schematically shows terminals included in the RAM cartridge.

The random access memory includes terminals $A_0$ through $A_{15}$ for receiving address selection signals, terminals $D_0$ through $D_7$ for input/output purposes of data signals, a chip selection terminal CS for receiving a chip enable signal CE, a write-in terminal W for receiving a write-in signal MEMW, and a read-out terminal R for receiving a read-out signal MEMR.

When the chip enable signal CE and the write-in signal MEMW bear the high level, desired information applied to the terminals $D_0$ through $D_7$ is written in the random access memory at a selected position determined by the address selection signals applied to the terminals $A_0$ through $A_{15}$. On the other hand, when the chip enable signal CE and the read-out signal MEMR bear the high level, the data information stored in the position selected by the address selection signals is developed through the terminals $D_0$ through $D_7$.

FIG. 13 schematically shows terminals included in the ROM cartridge. Like elements corresponding to those of FIG. 12 are indicated by like numerals.

When the chip enable signal CE bears the high level, the data information stored in the memory section selected by the address selection signals applied to the terminals $A_0$ through $A_{15}$ is developed through the terminals $D_0$ through $D_7$. The ROM cartridge does not include the write-in terminal W and the read-out terminal R.

Since the chip enable signal CE is developed either in the write-in mode or the read-out mode, there is a possibility that the ROM cartridge erroneously operates when the chip enable signal CE is directly applied to the ROM cartridge.

FIG. 14 shows a modified circuit for ensuring accurate operation when the ROM cartridge is employed. Like elements corresponding to those of FIGS. 12 and 13 are indicated by like numerals.

In this example, an AND gate 140 is provided, which receives the chip enable signal CE and the read-out signal MEMR. An output signal of the AND gate 140 is applied to the chip selection terminal CS, whereby the read only memory is operable only when both the chip enable signal CE and the read-out signal MEMR are developed.

To detect whether the inserted cartridge is the ROM cartridge or the RAM cartridge, a marking terminal is provided at the cartridge. FIG. 15 shows terminals of the RAM cartridge. Like elements corresponding to those of FIG. 12 are indicated by like numerals.

A marking terminal S is provided at an end of a terminal unit 15. The marking terminal S is constructed to bear the high level when the cartridge is the RAM cartridge, and the low level when the cartridge is the ROM cartridge. When the cartridge which has the marking terminal S of the low level is inserted into the opening 4 of the control unit 2 (see FIG. 1) the chip enable signal CE is applied to the cartridge through the AND gate 140 as shown in FIG. 14.

Figure 16:
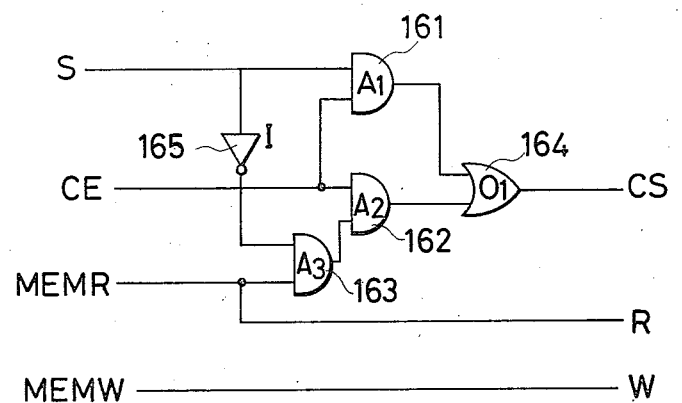
FIG. 16 is a block diagram of a logic circuit associated with the memory cartridge of FIG. 15.

FIG. 16 shows a logic circuit for developing the chip enable signal, the read-out signal and the write-in signal when the cartridge shown in FIG. 15 is employed.

The logic circuit of FIG. 16 is responsive to the output signal derived from the marking terminal S. The logic circuit mainly comprises AND gates 161, 162 and 163, an OR gate 164, and an inverter 165. As already discussed with reference to FIG. 15, the output signal derived from the marking terminal S bears the high level when the RAM cartridge is employed, and the low level when the ROM cartridge is employed.

More specifically, when the RAM cartridge is employed, the output signal derived from the marking terminal S bears the high level and, therefore, the AND gate 161 becomes conductive. The chip enable signal CE is applied to the chip selection terminal CS through the AND gate 161 and the OR gate 164. The output signal derived from the marking terminal S is also applied to the AND gate 163 through the inverter 165. Therefore, the AND gate 163 is not conductive.

When the ROM cartridge is employed, the AND gate 161 is not conductive, and the AND gate 163 becomes conductive. The chip enable signal CE is applied to the chip selection terminal CS through the AND gate 162 and the OR gate 164 only when the chip enable signal CE and the read-out signal MEMR are simultaneously developed.

Figure 17:
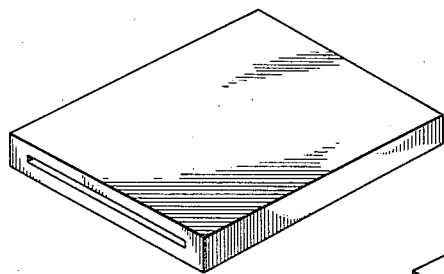
FIG. 17 is a perspective view of another embodiment of an RAM cartridge of the present invention.
Figure 18:
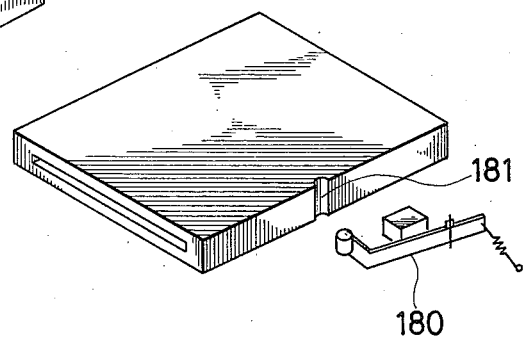
FIG. 18 is a perspective view of another embodiment of an ROM cartridge of the present invention.

FIGS. 17 and 18 show another embodiment of the RAM cartridge and the ROM cartridge, respectively.

A mechanical detection means 180 is disposed in the opening 4 of the control unit 2 (see FIG. 1). The ROM cartridge is provided with a groove 181 to which the mechanical detection means 180 responds. The RAM cartridge is not provided with such a groove.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A combined home-use-television set/calculator system comprising:
    a control unit including:
        central processor means for conducting arithmetic calculations; and
        display control means for displaying calculation results derived from said central processor means on an image screen of the home-use-television set;
    a memory cartridge exchangeably secured to said control unit; and
    a keyboard unit exchangeably connected and secured to said control unit for introducing desired information into said central processor means, wherein a specific memory and a specific keyboard unit are selected to operatively function relative to each other.

2. The combined home-use-television set/calculator system of claim 1, wherein said memory cartridge stores a program sequence of a specific operation, of which an output signal controls the operations of said central processor means.

3. The combined home-use-television set/calculator system of claim 2, wherein said memory cartridge comprises a read only memory cartridge.

4. The combined home-use-television set/calculator system of claim 2, wherein said memory cartridge comprises either a read only memory cartridge or a random access memory cartridge.

5. The combined home-use-television set/calculator system of claim 4, wherein said control unit comprises a housing having an opening for accommodating said read only memory cartridge and said random access memory cartridge.

6. The combined home-use-television set/calculator system of claim 1, 2, 3, 4 or 5 further comprising a printer for printing out said calculation results.

7. The combined home-use-television set/calculator system according to claim 1, wherein a memory unit for storing the program sequence being operatively incorporated in the keyboard unit which is exchangeable.

8. The combined home-use-television set/calculator system according to claim 7, wherein the combined keyboard and memory unit being operatively stacked and bound together in a notebook fashion.

9. A combined home-use-television set/calculator system comprising:
- a control unit including:
  - central processor means for conducting arithmetic calculations; and
  - display control means for displaying calculation results derived from said central processor means on an image screen of the home-use-television set;
- a memory cartridge exchangeably secured to said control unit for storing a program sequence of a specific operation, of which an output signal controls the operations of said central processor means, said memory cartridge comprising either a read only memory cartridge or a random access memory cartridge; and
- a keyboard unit exchangeably connected and secured to said control unit for introducing desired information into said central processor means;
- said control unit having a housing with an opening for accommodating said read only memory cartridge and said random access memory cartridge and including detection means for detecting whether the memory cartridge accommodated within said opening is the read only memory cartridge or the random access memory cartridge.

* * * * *